(12) United States Patent
Williams

(10) Patent No.: US 7,512,987 B2
(45) Date of Patent: Mar. 31, 2009

(54) ADAPTIVE DIGITAL RIGHTS MANAGEMENT SYSTEM FOR PLURAL DEVICE DOMAINS

(75) Inventor: Jim C. Williams, Yorba Linda, CA (US)

(73) Assignee: Motion Picture Association of America, Sherman Oaks, CA (US)

( * ) Notice: Subject to any disclaimer, the term of this patent is extended or adjusted under 35 U.S.C. 154(b) by 828 days.

(21) Appl. No.: 11/033,606

(22) Filed: Jan. 11, 2005

(65) Prior Publication Data

US 2006/0123485 A1    Jun. 8, 2006

Related U.S. Application Data

(63) Continuation-in-part of application No. 11/003,864, filed on Dec. 3, 2004.

(51) Int. Cl.
*H04N 7/16* (2006.01)
*H04L 9/00* (2006.01)

(52) U.S. Cl. .......................................... 726/27; 705/51
(58) Field of Classification Search ........................ None
See application file for complete search history.

(56) References Cited

U.S. PATENT DOCUMENTS

| | | | |
|---|---|---|---|
| 7,010,810 B2 * | 3/2006 | Ladwig | ....................... 726/29 |
| 7,450,930 B2 * | 11/2008 | Williams et al. | ............. 455/411 |
| 2002/0082997 A1 * | 6/2002 | Kobata et al. | .................. 705/51 |
| 2002/0157002 A1 * | 10/2002 | Messerges et al. | .......... 713/155 |
| 2005/0002527 A1 * | 1/2005 | Codet et al. | .................. 380/239 |
| 2005/0114672 A1 * | 5/2005 | Duncan et al. | .............. 713/182 |
| 2005/0234768 A1 * | 10/2005 | Wald et al. | ..................... 705/14 |
| 2007/0198361 A1 * | 8/2007 | Ronning et al. | ............... 705/26 |

OTHER PUBLICATIONS

Liu, Qiong, "Digital Rights Management for Content Distribution," Australasian Information Security Workshop 2003, Conferences in Research and Practice in Information Technology, vol. 21. C.*

* cited by examiner

*Primary Examiner*—Kaveh Abrishamkar
(74) *Attorney, Agent, or Firm*—Connolly Bove Lodge & Hutz LLP; Jonathan A. Jaech

(57) ABSTRACT

A system and methods of digital rights management for plural device domains that adapts in response to external use data. Domain size parameters of a target domain that includes multiple receiving devices are determined. The domain parameters are compared to a domain benchmark developed from external data. A risk index for the target domain is then generated and used to create content usage rights for controlling access and usage of digital content by the collection of devices within that domain. The system may include a plurality of information-gathering tools for collecting the domain parameters from a plurality of independent domains as well as from the target domain.

35 Claims, 3 Drawing Sheets

ADAPTIVE DIGITAL RIGHTS MANAGEMENT SYSTEM FOR PLURAL DEVICE DOMAINS

CROSS-REFERENCE TO RELATED APPLICATION

This application is a continuation-in-part of co-pending application Ser. No. 11/003,864, filed Dec. 3, 2004.

BACKGROUND OF THE INVENTION

1. Field of the Invention

The present invention relates to digital rights management, and more particularly, to systems and methods managing use of digital content in a plural device domain that is adaptive to external use data.

2. Description of Related Art

Increasingly widespread consumer access to broadband networks has created new problems in the distribution of digital content. On the one hand, it is desirable to make digital content conveniently available for all intended uses to consumers. For example, it may be desirable to provide streaming content to reception devices that are broadband network-enabled, to one or more mobile devices capable or disconnecting and reconnecting to a local network belonging to an account holder, or to local networks with much greater numbers of connected playing devices than traditionally encountered. Such uses may become increasingly important as consumers continue to purchase entertainment and communication devices of ever-increasing kinds.

Content providers should be able to control subscribers' access to or redistribution of digital content, with or without payment of additional fees. But this is becoming increasingly difficult as local subscriber networks and uses of content become more complex and varied. In a complex consuming environment, it may be difficult to discern legitimate uses of content from uses that are harmful to the content provider. For example, it may be desirable to provide a digital cable signal to multiple reception sites within a specific "personal domain," such as a set-top boxes within the user's home, other devices within the user's home, office or automobile and even portable personal devices within the user's domain. Such arrangements may, for example, permit consumers to view purchased content in any desired room of the consumer's house. Various other redistribution schemes may also be desirable; for example, it may be desirable to permit redistribution from the cable reception device to any device owned by that same family regardless of whether it is in the consumer's primary house, vacation home, office, car or on his person so long as all of these locations belong to a specific "personal domain." It may be desirable to permit all or some of such uses, while at the same time effectively preventing redistribution to non-subscribing consumers outside of the subscribing family or other authorized personal domain.

Current systems exist whereby a content rights holder or conditional access broadcaster can assign the right to view content to a single reception device that is associated with a single account/address/customer. Additionally, these systems may permit addition of receivers to an account and may charge according to the number of receivers. Such a system that combines multiple receivers into a single account is currently implemented by using back-office computer systems with a database program that associates two or more consumer reception devices with a single account/address/customer. Other systems exist, such as the Digital Transmission Content Protection system (DTCP), that limit the number of receiving devices that can be active for a particular transmission. DTCP limits a number of receiving devices to 63 in one instance. Such static numerical limits—whether one, two, sixty-three, or any other number—are essentially arbitrary and hence, may be overly restrictive or not restrictive enough. For example, such systems may not allow sufficient flexibility of the broad-band enabled home network to create a personal domain including several locations as well as mobile and portable devices. At the same time, other subscribers may easily redistribute protected content to one or more unauthorized destinations outside of the subscribing domain, without exceeding numerical limits.

Thus, it is desirable to provide a system and method for characterization of an acceptable personal domain, and control of distribution to the multiple devices in that personal domain, in a manner that permits a greater flexibility and precision of control over access and usage of content by multiple devices within the domain. It is further desirable that the system be difficult to circumvent, while remaining convenient and easy to use for intended uses of the content at issue, including permissible redistribution and use by mobile, remote and/or disconnected devices or clusters of devices within a user's authorized domain.

SUMMARY OF THE INVENTION

The present invention provides a system and method for managing domain size in a conditional access system, digital rights management system or other similar content protection system. A domain may be comprised of devices belonging to an individual, a family, a household, an extended family, "friends and family", a particular business, or any other affinity group for which the size of a domain may constitute a contributing or determining parameter. Devices in the domain may be connected via a local area network, peer-to-peer network, or any other connection or combination of the foregoing. In addition, devices may be divided in clusters of locally connected sub-networks, such as a home network and an office network belonging to the same personal domain. Devices or clusters or devices may periodically be disconnected and reconnected with the domain network, such as a personal portable device.

A system according to the invention extends the concept of simply counting devices associated with a single account or connections associated with a single transaction. Instead, a more sophisticated model of an affinity group of devices is developed to model acceptable behaviors from the applicable affinity groups, e.g. home networked devices, vacation home devices, personal portable devices and devices in offices or automobiles. This model serves as a benchmark of domain size for managing access to digital content by multiple devices within a domain.

The benchmark domain model may be developed, for example, by gathering configuration and/or transaction data from a plurality of independent domains. The model may include parameters such as device count or number of transactions to characterize a size of the target domain. The model may also be adjusted to account for trends or other changes in domain usage, using information collected from a plurality of independent domains over a period of time. In general, information collected from a plurality of independent domains may be distilled into a statistical measure of one or more benchmark parameters for characterizing a domain, such as the number of devices or number of transactions.

A risk index for a target domain may then be developed based on a comparison to the benchmark model or parameters to corresponding parameter data gathered from the target domain. This risk index may be determined based on a comparison of one or more of the domain parameters of the benchmark model, or by a weighted combination of several of the parameters. The risk index may also vary depending on the number of devices within the domain that are compliant, compared to a number of non-compliant devices. Since compliant devices are easier for a corresponding digital right management system to monitor and manage, whereas non-compliant devices may be more difficult to accurately manage, a domain comprised entirely or primarily of compliant devices may be assigned a lower risk index.

The risk index may then be used to determine specific usage rules for the data within the target domain and to manage content access by the user. In general, domains with low risk indices may be permitted a greater degree of freedom to use, distribute and store information. Domains with high risk indices may be subject to greater restrictions In an embodiment of the invention, statistical data on consumer behavior may be used to construct a model for controlling access, usage and re-distribution of content within the personal domain. The behaviors analyzed may include, for example, the rate at which people typically buy new consumer electronics, the rate at which people typically buy new computer products, the rate at which people typically buy new telephony products, the time period during which people typically own or control such products exclusively, the rate at which people typically connect and disconnect networked devices or clusters or devices, resource demands of a device on an audio-visual network, or any other measure of domain size or usage. Model data may be designed to correlate to usage rules that may be applied at the device or domain level. These usage rules may be updated as the statistical model of a benchmark domain evolves over time.

For example, the system may characterize the target domain based on at least one domain parameter, such as number of receiving devices connected in the domain or number of data transactions performed by devices connected in the domain. These data transactions may include, for example, requesting media content, playing media content, storing data, accessing stored data and transmitting data to a downstream device. In the alternative, or in addition, the size parameter may be measured using other metrics, such as: number of transactions in combination with a device count, weighted combinations of multiple types of transactions, weighted combinations of multiple types of transactions over time, processing power, communications capacity or configuration of the network.

The system then compares the parameters for characterizing the target domain state to the benchmark domain parameters in order to develop a risk index for the target domain. This risk index is then used as input to a rule development algorithm to develop specific usage rules for devices within the target domain. Usage rules may be modified as devices or clusters of devices connect to and disconnect from the domain. For example, usage rules may be developed to allocate a certain number of access slots (i.e., additional devices that may receive content from a disconnected device) for a device or cluster of devices that disconnect from the network. The slots allocated to the disconnected device may then be deducted from the permissible slots remaining with the home network. In some cases, connection and disconnection events may cause changes in a domain's risk index, for example, multiple disconnections and reconnections by a device to different domains may be considered a pattern of threatening use that would justify increasing the risk index. In addition, changes in domain size should naturally be accounted for when applying usage rules based on domain size.

For example, a digital rights management system may gather data over a network, such as the Internet, from several independent household domains regarding the number of devices within their domains and analyze this data to determine a benchmark parameter for number of devices within a typical household domain. Then, the benchmark may be compared with domain size information from a target household domain to develop a risk index and specific usage rules for the target domain. Using this method, the system would be able to provide tailored usage rules for a target domain based on its risk index, such as how many devices in the domain could access the content.

A more complete understanding of the method and system for domain size characterization and management will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for determining and managing the size of a domain that overcomes the limitations of the prior art. Domain size parameters may, in turn, be used to determine content usage rights for a collection of devices associated with an account holder or subscriber, i.e., a domain.

The method and system make use of a combination of available statistical data regarding actual use of various independent domains, for example, home networks, in relation to other personal devices used such as, vacation home devices, office devices, automobile devices, personal portable devices. Data gathered from multiple existing independent domains may be used to generate an aggregate model of domain usage. The model may, in turn, be used as a benchmark for creation of rules for managing comparable affinity groups. The statistical data regarding existing networks should provide a benchmark indication of consumer expectations for the number of devices in a given type of domain and their behavior in connecting to and disconnecting from that domain. Given such a benchmark, the system may flexibly and adequately control the number of receiving devices within a domain that should be authorized to receive the digital content. In addition, use of content may be controlled as a device or multiple devices disconnect from the networked domain, and become a "wandering" device or cluster. For example, each wandering device may be allotted a certain number of the overall permitted device connections when it wanders, depending on the modeled behaviors for that type of device.

Figure 1:
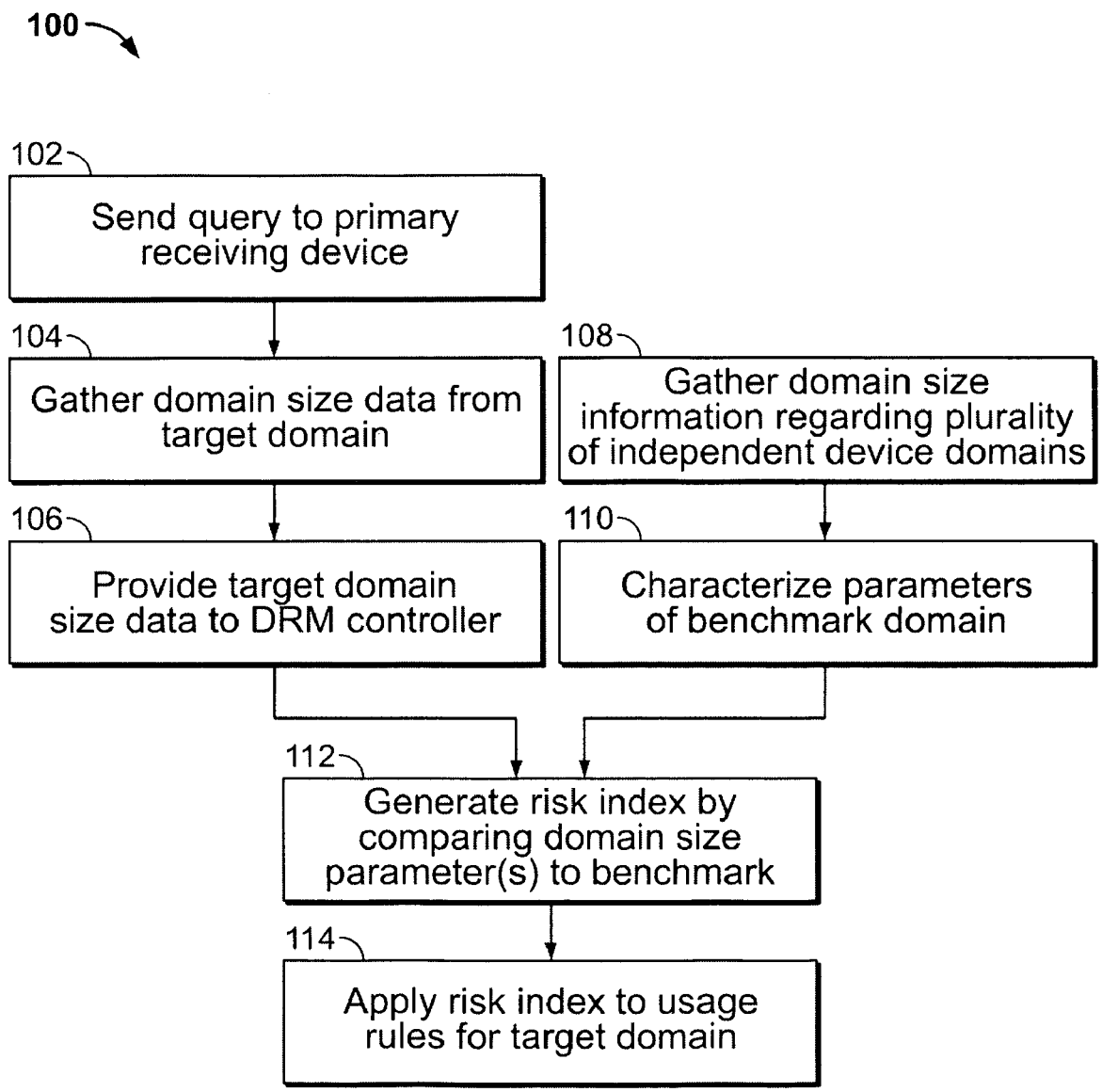
FIG. 1 is a flow chart showing exemplary steps for determining a risk index for a target domain.
Figure 2:
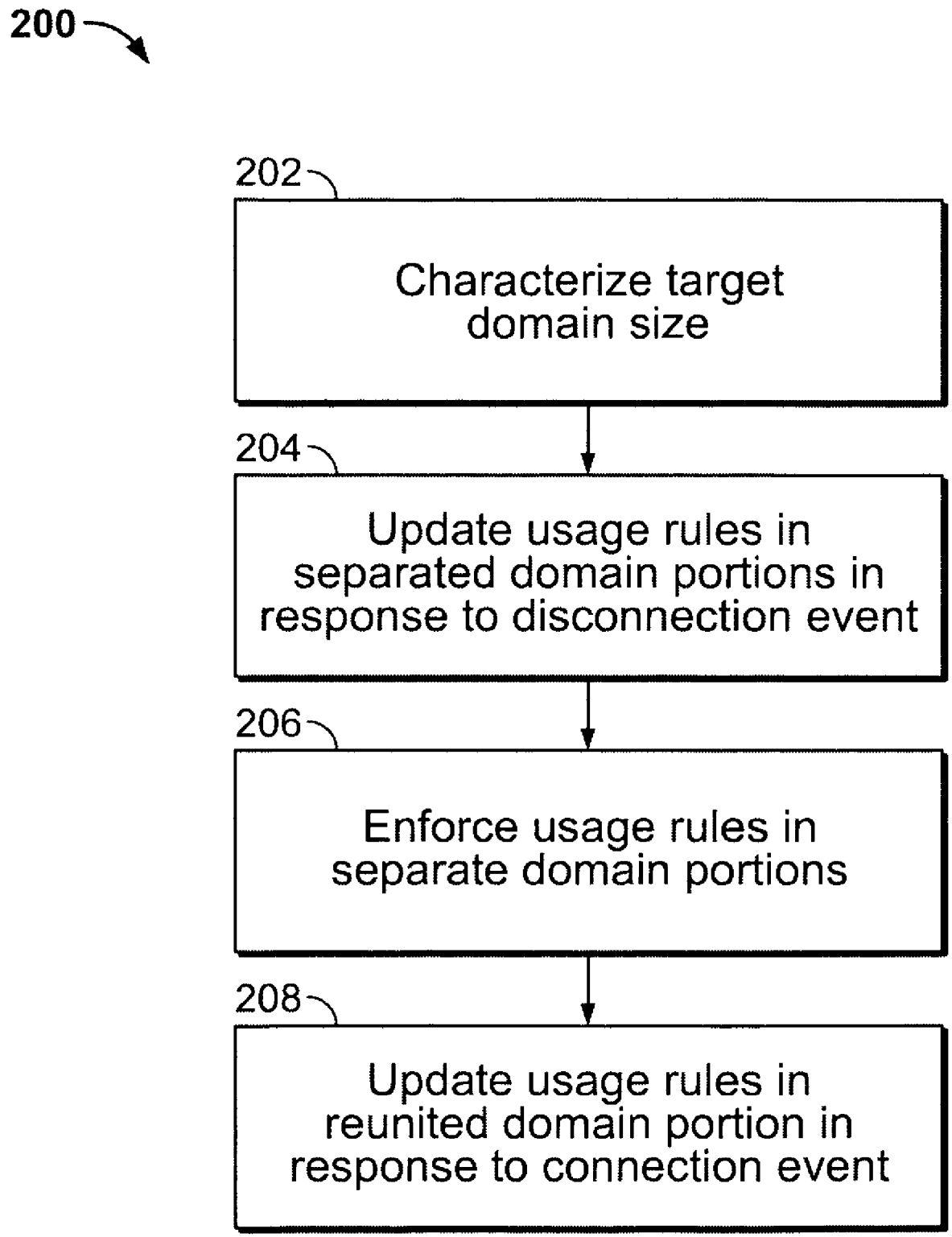
FIG. 2 is a flow chart showing exemplary steps for updating the usage rights for a domain as devices within the domain are connected and disconnected.
Figure 3:
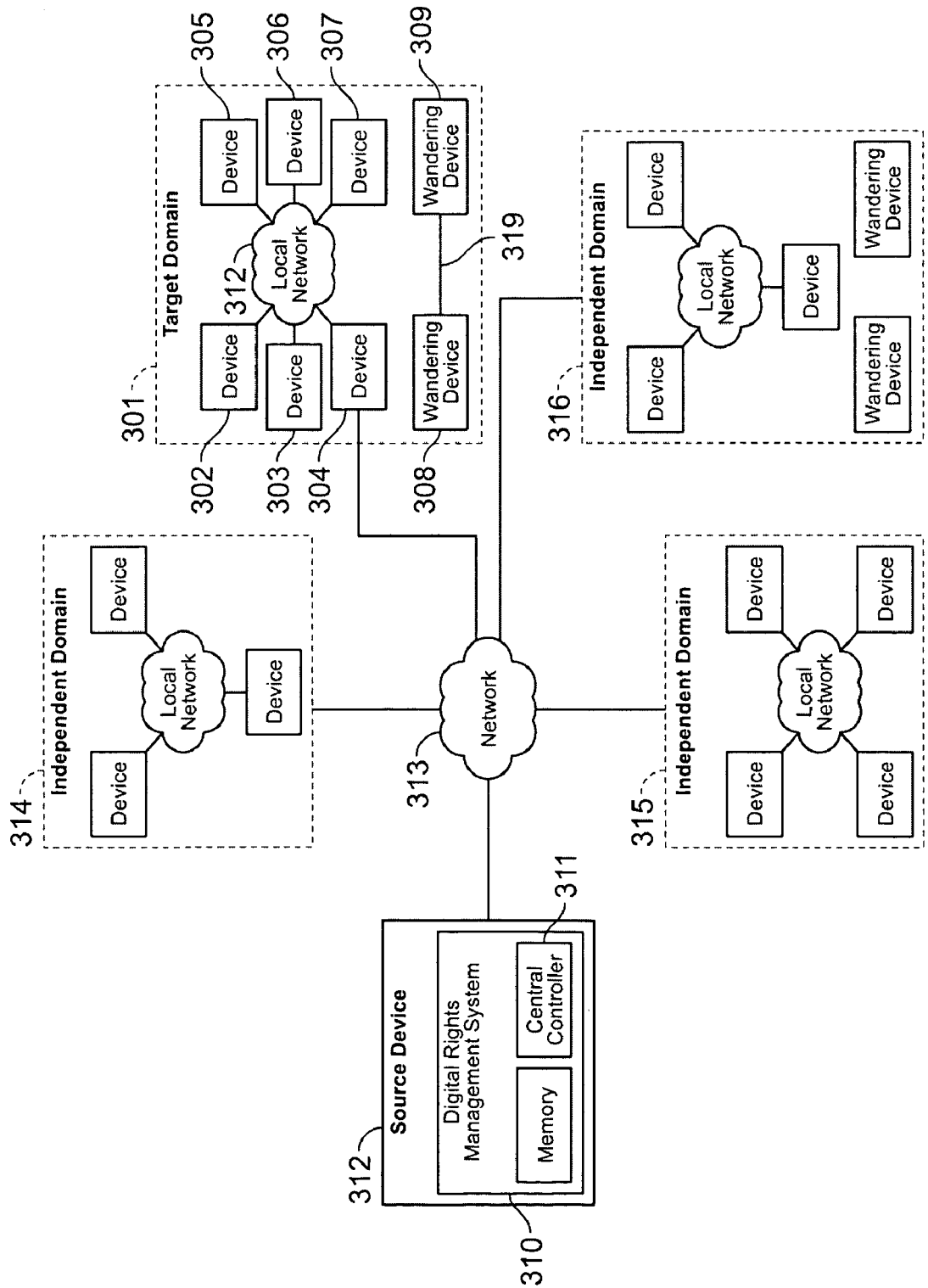
FIG. 3 is a block diagram showing an exemplary system for generating a risk index for the target domain based on an assessment of target domain size.

FIGS. 1, 2 and 3 depict examples of the invention using a rights management system, which may be centralized or distributed in any desired degree. For example, aspects of the invention may be performed using a controller included in a provider-supplied device, for example, a set-top device that controls distribution of content to downstream devices. In the alternative, the invention may be implemented using a decentralized rights management system embodied in multiple devices in the personal domain. As known in the art, system communications may be secured by using any suitable cryptographic method.

FIG. 1 shows exemplary steps of a method 100 for determining domain size of the target domain, applying a risk index to the target domain and developing specific usage rules for the domain, based on predetermined business rules. At step 102, a Digital Rights Management (DRM) system controller sends a query to a primary receiving device within a user's network, requesting information regarding domain size, such as a number of devices currently connected in the target domain. The primary receiving device may be any one of the devices within the target domain that is currently connected to the DRM system. In the alternative, the query may be sent to multiple devices in the domain, which respond either independently or in a coordinated fashion.

A suitable DRM system may be any content management system known in the art that is capable of protecting and managing access to content, for example, a conditional access system of a Pay TV broadcaster. In addition, or in the alternative, the DRM system may request information regarding a number of transactions performed in the domain, such as playing digital content, storing data or transmitting data downstream, the number of devices disconnected from the domain, the combined processing power of devices within the domain, the communications capacity of the devices or the configuration of the communications network. The DRM system may request one or more of these alternative parameters, in addition to requesting the number of devices currently connected to the domain, to characterize the target domain state using several parameters. Domain size information may, in the alternative, be queried from multiple devices in the domain.

In addition, the DRM system may request information regarding a number of "compliant" devices compared to the number of "non-compliant" devices. Compliant devices may comprise a reporting module capable of reporting device status, according to a pre-determined protocol or the DRM system. Non-compliant devices lack a reporting module that is compatible with the DRM system, and hence cannot report on transactions that they perform. In an embodiment of the invention, domains comprising one or more non-compliant devices are assigned a higher risk factor than domains comprised entirely of compliant devices. Thus, domains with compliant devices may be subject to less restrictive rules. For example, it may be possible to place very high or no limits on the number of compliant devices in a domain (so long as not used in a threatening way), because it is possible to track use patterns using the reporting capability of the compliant devices. Because compliant devices may be subject to fewer restrictions, consumers may be encouraged to purchase compliant devices when adding devices to a domain.

The extent to which the presence of non-compliant devices in a domain results in the application of more restrictive content-protection rules may depend, among other things, on the degree to which compliant devices have been adopted. Until such time as a DRM system according to the invention becomes more widespread and compliant devices are widely adopted, it may be possible to place more liberal restrictions on the use of non-compliant devices. As non-compliant devices become obsolete and are gradually replaced by compliant devices, domain usage rules could be adjusted accordingly. The foregoing example also illustrates use of a domain model that changes as data is sampled over time.

Information may, in the alternative, be obtained at step 103 without an express query from an external controller. For example, one or more devices in a domain may be configured to automatically send information to an upstream controller at periodic intervals. Either way, at step 104, information requested by the DRM system for characterizing the target domain is collected by a controller of the system. Generally, to ensure domain data is kept current, step 104 may be performed at periodic intervals, at times requested by a DRM controller, or upon changes (e.g., connection or reconnection of a device) in domain size.

Various assessment tools may be applied in a domain to collect information needed for the DRM system. These tools may include, for example, device counting tools for determining a number of active devices networked to the user's domain, domain management tools capable of determining additions and withdrawals of devices from the active personal domain or identifying compliant versus non-compliant devices, and tools for measuring the number of transactions within the domain, the combined processing power of devices within the domain, communications capacity of the devices, or the configuration of the communications network. Such tools may be implemented in any suitable combination of hardware or software within the personal domain, and may include tools as known in the art, for example active device counters or such tools as may be developed.

At step 106, the receiving device transmits this data to the DRM system. Data may be transmitted using any suitable method, such as by including it in an encrypted message over the network, for example the Internet or a cable or satellite network. In the alternative, the data may be provided over a private communication line such as a dial-up telephone line or a satellite link.

Concurrently or prior to steps 102-106, the DRM system gathers information regarding domain size from a plurality of independent domains. At step 108, the DRM system may follow the same steps as in 102-106 to gather the same information regarding domain size from a plurality of independent domains. In addition or in the alternative, data may be gathered using other methods known in the art. For example survey methods and data may be included. Such other data may include, for example, (1) the rate at which people typically buy new consumer electronics products, (2) the rate at which people typically buy new computer products, (3) the rate at which people typically buy new telephony products, (4) the time period during which people typically own or control such products exclusively, (5) the rate at which people typically connect and disconnect networked devices (6) the resource demands of a device on an audio-visual network, and (7) incidence of copyright infringement or other unauthorized use associated with different domain configurations. Such data may augment or supplement the data gathered from a plurality of existing domains to generate more sophisticated models of an affinity group of devices, i.e. a domain. However, because data collected at step 108 will be used in benchmarking domains connected to the DRM system, it should also be helpful to collect the same kinds of data as are available from target domains.

At step 110, the DRM system compiles information gathered at step 108 to generate a benchmark domain for generating usage rules and for comparing to the target domain characterization. The benchmark domain model may represent an aggregate of domain states of independent device domains, and should be designed to assess risks of unauthorized data use for particular target domains. In an embodiment of the invention, statistical tools are used to define a risk associated with domain parameters to be requested from target domains. One or more parameters may be used to define classes or types of domains, and different rules or risk indices may apply to different types of domains. For example, the benchmark data may be used to guide the creation of rules for managing various types of domains such as a family, a household, an extended family, "friends and family", a business, or any other domain where size of the domain is an important factor in managing access to and use of digital content.

A benchmark domain model may be as simple as a single-dimensional parameter, for example, a number of connected devices in each target domain. This single parameter may be analyzed over a sampling set to determine any useful statistical measures, for example, a mean or standard deviation. Target domains may, if desired, be classed according to non-quantifiable criteria such as geographic location, zip code, and a benchmark calculated for each classification. Each particular domain may be measured against the benchmark for its classification. For example, domains located in a first zip code may be considered "medium risk" if containing more than three and less than six connected devices, while domains in a second zip code may be measured against higher or lower benchmarks.

However, a multi-dimensional model, i.e., an n-dimensional model in which "n" is greater than one, should afford greater accuracy and precision in preventing harmful use of protected content while permitting harmless uses. To build such a model, numerous quantifiable parameters are collected and analyzed. In addition to a number of connected devices in a domain, such parameters may include, for example, a number of various types of transactions (e.g., viewing, storing, transmitting) performed in a domain, number of family members included with the account, number of different domains devices in the domain have belonged to, and so forth. Each parameter may be analyzed using statistical tools and associations as measured between various quantifiable and non-quantifiable parameters. For example, correlation coefficients may be measured between different criteria and known incidents of unauthorized or harmful use of content. These may be used to predict the likelihood that a particular domain will be used in an unauthorized way. The accuracy of such predictions should increase as additional data is gathered over multiple parameters. Various statistical modeling prediction techniques are known in the art. Any suitable method may be used.

At step 112, a controller within the DRM system compares the information from the target domain with the domain benchmark generated in step 110 to develop a risk index for the target domain. The risk index may be generated based on a comparison of a single domain state parameter, or multiple domain state parameters, depending on what information was collected by the DRM system in steps 102-106. For example, the risk index may be determined based on a comparison of the quantity of receiving devices, the quantity of data transactions performed by devices connected to the domain or any combination of the various assessment parameters used by the DRM system to characterize the target domain to the corresponding benchmark domain parameters. For further example, the risk index may be affected by the number of compliant devices compared to the number of non-compliant devices. For example, if the target domain has a higher number of non-compliant devices than suggested by the benchmark domain, even though its total number of devices is acceptable according to the benchmark domain, the target domain may be given a higher risk index because of less ability of the DRM system to monitor and manage the usage of the non-compliant devices.

A risk index should be understood as encompassing any useful assessment of relative risk associated with a particular target domain. It need not necessarily be represented by a numeric or other tangible output of an assessment process. Instead, application of content-protection rules to a domain based on an assessment of domain size (in a general sense) should be considered within the scope of the invention, whether or not a tangible risk index is produced as an intermediate step.

At step 114, the controller uses the risk index for the target domain to develop or apply specific rules for use of digital content by the collection of devices in the target domain. These content usage rules may be supplied by the content provider based on a business model for the distributed content, that is, rules may differ for different content. In general, usage rules should conform, to the extent desired, to the model of consumer behavior over the sample set for the benchmark model, taking into account the risk index of the target domain. For example, usage rules may include a limit on the number of devices permitted to access the material. In addition, the usage rules may limit various other actions, for example, the number of devices each networked home device is permitted to add, the number of disconnected or wandering devices permitted to access the material, or a pre-determined reserved number of devices each wandering device may connect to. Usage rules may be modified as wandering devices connect to and disconnect from the network, either freeing or reserving an allocated number of device connections.

A more sophisticated and responsive set of usage rules should provide the user adequate flexibility in managing the allocation of authorized devices within his personal domain. At the same time, the content provider should maintain a high degree of confidence that unauthorized access or redistribution is, in the aggregate, effectively controlled. Usage rules should be designed to balance these competing objectives, and the invention is not limited to a particular usage rule. One of ordinary skill should be able to select and apply adequate usage rules depending on the circumstances. Usage rules may accompany transmitted content, and may be configured for application by compliant devices in the domain. Control over non-compliant devices may be achieved using an upstream compliant device as known in the art.

FIG. 2 shows exemplary steps of a method 200 for updating usage rules and managing access of the target domain as devices connect to and disconnect from the target domain. Method 200 begins after a preceding process of characterizing the target domain for determining a risk index and usage rules for a target domain has been completed, as previously described in method 100. At step 202, the DRM system characterizes the target domain and assigns specific usage rules for the target domain according to the characterization. Initially, the target domain may consist of a number of locally networked devices. However at step 204, one or more of those devices may disconnect from the locally networked domain. The disconnecting device may be a single portable personal device, or it may comprise a cluster of devices that temporarily or permanently disconnects from the main domain network. When the disconnecting device or cluster disconnects from the network in step 204, a number of "slots" representing authorized additional devices or authorized transactions, may be allocated to the disconnecting device or cluster. Slots for the remaining devices in the main networked domain and the disconnected wandering device may be updated by a central controller. The wandering device may take with it a pre-determined number of reserved slots, which it may use to connect to additional devices, up to the reserved number. The additional devices in the wandering cluster may therefore be able to access and use digital content.

The number of reserved slots may differ for each wandering device, depending on the usage rules applied to the overall system and the particular type of wandering device. For example, a personal portable device might be permitted zero or one additional slot, but a wandering personal computer or set top box might be permitted several additional slots. This may be desirable, for example, to permit a user to use a cluster of connected devices at a vacation home, office or other location. In addition, the user may be able to override a default allocation established by the DRM system and specify a different number of reserved slots for the wandering device. In this case, however, the user should not be permitted to alter to overall limits on usage for the domain as determined by the DRM system, and the number of slots available for the remaining networked devices should be adjusted accordingly. If one or more devices disconnects from the main target domain, the user may also be able to establish priorities for allocating the reserved slots among the several wandering devices.

At step 206, the usage rules are enforced within the main domain and any wandering devices or clusters. Usage rules may be configured for application by compliant devices in the domain. For example, a wandering device may be configured so as to not distribute content to downstream devices if to do so would exceed its allocation of slots. Usage rules may be determined at the time a domain is configured or subsequently modified. In the alternative, or in addition, usage rules may accompany transmitted content, and may be configured for application by compliant devices in the domain. Control over non-compliant devices may be achieved using an upstream compliant device as known in the art. For example, a primary receiving device for a domain may retain management of the varying usage by the devices in the domain. Enforcement functions may also be pushed upstream of the domain. For example, an upstream source may refuse to transmit particular content or decryption keys to a domain that exceeds a certain risk index. Downstream compliant devices may also be used. For example, a compliant device may refuse to play content if it determines that it is not authorized to do so. A combination of upstream and downstream control may also be used.

In addition, the number of slots allocated for each wandering device may vary depending on the presence or absence of threatening use patterns. For example, the number of slots may be reduced when threatening use is perceived. Threatening use may be perceived when domain parameters exceed thresholds defined by the domain benchmark. For example, observed behaviors such as a high frequency of joining and leaving membership in the domain, a long history of membership in different domains or alternating in and out of membership in a particular domain may signal threatening use. Factors other than domain size may also be taken into account. For example, the location of the device in a particular geographic area or the relative location of the device with respect to another device may be considered. Other factors may include, for example, an association of the device with a particular user or account that has been marked as threatening, recording of security breaches within the network; or certainty of compliance with other obligations like location of the device or association with a single user or family; or connection to a back office security control system.

At step 208, one or more previously disconnected devices or a cluster of devices reconnects to the network. Upon reconnecting, the device(s) returns the reserved slots that it had previously withdrawn. One of the devices within the main network of the target domain reports the return of the disconnected device to other devices in the domain. In the alternative, or in addition, a report may be made to an external controller for the DRM system. The returned slots may again be free for use by the overall domain. If a wandering device or cluster fails to reconnect to its home domain after a certain period of time, it may be assumed permanently disconnected. In such case, its allocation of slots may be restored for use by other devices. At the same time, the disconnected device or cluster may be disabled from further use of protected content. If a permanently disconnected device attempts to reconnect to a domain, it may be permitted to do so only if an additional connection slot is available.

Another situation that may arise is connection of a wandering device or cluster to different home domains. Treatment of this situation may depend on various parameters, including baseline domain models and business objectives for protected content. It should be noted that physical connection of a device or cluster to devices from another domain does not constitute membership in or request for membership in that other domain. Certain usage actions may be authorized for devices that physically connected to one another without being members of the same domain. Therefore, connection to more than one domain may be permitted where membership in more than one domain may be restricted. Domains may also contain a certain number of temporary slots for visiting, compliant devices to allow usages that might otherwise be disallowed for devices that are not members of that domain. In general, a baseline for use in characterizing wandering devices or clusters may be developed and applied to better discern threatening use patterns from patterns that are considered permissible.

FIG. 3 is a block diagram showing an embodiment of a system 300 for characterizing and managing access and usage of digital content by a domain 301 containing multiple receiving devices 302-309. A digital right management system 310 and controller 311 may be included in a source device 312. In an alternative embodiment, or in addition, elements of the DRM system and controller may be distributed among various receiving devices within the target domain.

In system 300, DRM system 310 located in source device 312 is connected via a network 313 to a plurality of independent domains 314-316 and to target domain 301. Any one of these domains may request digital content from source 312. The network 313 may comprise a suitable network or networks for transmitting digital information, for example, the Internet, a digital satellite TV link or other wired or wireless networks. In the alternative, or in addition, the network connecting the DRM system with the domains may comprise a private communication line such as a dial-up telephone line or a satellite link. Within the domains, such as target domain 301, multiple receiving and playback devices 302-307 may be connected via a local network 317, such as an in-home network, local area network or wide-area network, or by a direct connection. In addition, one or more wandering devices 308-309 may periodically connect to and disconnect from the local network 317. Any number of wandering devices may also be connected, such as via a connection 319, to comprise a wandering cluster. A wandering device or cluster may also connect to or disconnect from a different domain other than the target domain 301.

The DRM system 310 is configured to obtain data characterizing the size and behavior of domains 301 and 314-316 over the network 313. One or more receiving devices within each domain, such as receiving device 304, may be configured to collect and send the domain characterization data to the controller 311 within the DRM system 310. This information may be transmitted over the network 313 using any suitable method, for example, by encrypting data and transmitting over an open network such as the Internet, or by using a secure channel.

The controller 311 may receive domain size data from both the plurality of independent domains 314-316 and the target domain 301. The DRM system comprises program instructions in a memory of controller 311 which may use the information from the independent domains 314-316 to develop a benchmark domain model for comparison with the target domain. This benchmark domain may also be developed from statistical data regarding domain state parameters. In addition, the controller 311 may track this data obtained at different times to adapt the benchmark to reflect trends regarding these parameters.

The controller may also be configured to compare the benchmark model to the parameter data obtained from the target domain 301 to develop a risk index for the target domain. The risk index may be determined from a single parameter such as the number of devices in the domain. In the alternative, multiple parameters such as the number of devices and the number of transactions performed by those devices, or a weighted combination of multiple parameters, may be used to develop a risk index as previously described. This risk index may then be used by the DRM system 310 in combination with business rules provided by the content provider to develop specific usage rules for the target domain 301, as previously described.

Having thus described a preferred embodiment of a method and system for assessing the size of a target domain and managing usage of content by that domain, it should be apparent to those skilled in the art that certain advantages of the within system have been achieved. It should also be appreciated that various modifications, adaptations, and alternative embodiments thereof may be made within the scope and spirit of the present invention. For example, a system with certain control parameters has been illustrated, but it should be apparent that the inventive concepts described above would be equally applicable for any number of logical and weighted combinations of control parameters relating to size of the target domain. In addition, the invention is not limited to a particular type of digital content, and may be used in the distribution of content to various types of receiving devices, including televisions, music players, general-purpose computing devices, communication devices such as mobile telephones, personal digital assistants and other similar devices. The invention is defined by the following claims.

What is claimed is:

1. In a system for controlling access to and usage of digital content within a domain that includes multiple receiving devices, a method for determining a risk index for a target domain, comprising:
   characterizing a domain state for a target domain, the domain state representing a measure of at least one domain parameter selected from (a) a quantity of receiving devices connected to the domain, or (b) a quantity of data transactions performed by devices connected to the domain, wherein the target domain comprises a group of interconnected receiving devices for a defined content subscriber;
   comparing the domain state for the target domain to a domain benchmark, the domain benchmark representing an aggregate measure of the at least one domain parameter for each of a plurality of independent device domains that are independent of the target domain; and developing a risk index for the target domain in response to the comparing of the domain state to the domain benchmark, the risk index representing an assessment of relative risk of unauthorized use of copyrighted data in the target domain.

2. The method of claim 1, further comprising determining the domain benchmark from the at least one domain parameter for each of the plurality of independent device domains.

3. The method of claim 1, further comprising reporting a change in domain state upon connection or disconnection of a receiving device from the target domain.

4. The method of claim 1, wherein characterizing the domain state further comprises determining a quantity of compliant receiving devices connected to the target domain, wherein each compliant device comprises a reporting module operative to report a device status according to a predetermined protocol.

5. The method of claim 1, wherein characterizing the domain state further comprises determining a quantity of non-compliant receiving devices connected to the target domain, wherein each non-compliant device lacks the reporting module.

6. The method of claim 1, wherein characterizing the domain state further comprises determining a quantity of transactions occurring within a predetermined period.

7. The method of claim 6, wherein characterizing the domain state further comprises determining a quantity of different types of transactions, the types of transactions comprising at least one of: playing media content, storing data, accessing stored data, and transmitting data to a downstream device.

8. The method of claim 2, wherein determining the domain benchmark further comprises using the at least one domain parameter pertaining to the plurality of independent device domains obtained at different times to identify trends in domain usage.

9. The method of claim 2, wherein determining the domain benchmark further comprises analyzing the at least one domain parameter pertaining to the plurality of independent device domains to develop a statistical measure of at least one domain group parameter, the at least one domain group parameter corresponding to the at least one target domain parameter.

10. The method of claim 1, further comprising characterizing the domain state based on plural target domain parameters of types selected from: a quantity of receiving devices connected to the target domain, a quantity of devices disconnected from the target domain, and a quantity of data transactions performed by devices connected to the target domain.

11. The method of claim 2, wherein determining the domain benchmark further comprises analyzing the at least one domain parameter for each of the plurality of independent device domains to develop a statistical measure of plural domain group parameters each corresponding to one of the target domain parameters.

12. The method of claim 1, further comprising developing usage rules for the target domain responsive to a current value of the risk index.

13. The method of claim 12, wherein developing the usage rules further comprises reserving a number of permitted connections for a device disconnected from the domain.

14. The method of claim 13, further comprising adjusting a number of remaining permitted connections for the domain, based on a number of permitted connections reserved when reserving the number of permitted connections.

15. The method of claim 12, further comprising developing second usage rules for a disconnected device after it is disconnected from the target domain, wherein the second usage rules are related to the usage rules.

16. The method of claim 15, wherein developing the second usage rules is performed using the disconnected device.

17. The method of claim 15, wherein developing the second usage rules comprises permitting the disconnected device to provide content to at least one additional device disconnected from the target domain.

18. A computer-readable medium holding program instructions for characterizing a domain state for a target domain independent of the plurality of device domains, the domain state representing a measure of at least one domain parameter selected from (a) a quantity of receiving devices connected to the domain or (b) a quantity of data transactions performed by devices connected to the domain, wherein the target domain comprises a group of interconnected receiving devices for a defined content subscriber;
comparing the domain state for the target domain to a domain benchmark, the domain benchmark representing an aggregate measure of the at least one parameter for each of a plurality of independent device domains that are independent of the target domain; and
developing a risk index for the target domain in response to the comparing of the domain state to the domain benchmark, representing a measure of risk of unauthorized use of copyrighted data in the target domain.

19. The computer-readable medium of claim 18, wherein the program instructions further comprise instructions for determining the domain benchmark from the at least one domain parameter for each of the plurality of independent device domains.

20. The computer-readable medium of claim 18, wherein the program instructions further comprise instructions for reporting a change in domain state upon connection or disconnection of a receiving device from the target domain.

21. The computer-readable medium of claim 18, further comprising program instructions for determining a quantity of compliant receiving devices connected to the target domain, wherein each compliant device comprises a reporting module operative to report a device status according to a predetermined protocol.

22. The computer-readable medium of claim 18, further comprising program instructions for determining a quantity of non-compliant receiving devices connected to the target domain, wherein each non-compliant device lacks the reporting module.

23. The computer-readable medium of claim 18, further comprising instructions for characterizing the domain state by determining a quantity of transactions occurring within a predetermined period.

24. The computer-readable medium of claim 18, further comprising instructions for characterizing the domain state by determining a quantity of different types of transactions, the types of transactions comprising at least one of: playing media content, storing data, accessing stored data, and transmitting data to a downstream device.

25. The computer-readable medium of claim 19, wherein the program instructions further comprise instructions for identifying trends in domain usage from the at least one domain parameter pertaining to the plurality of independent device domains obtained at different times.

26. The computer-readable medium of claim 19, wherein the program instructions further comprise instructions for analyzing the at least one domain parameter pertaining to the plurality of independent device domains to develop a statistical measure of at least one domain group parameter, the at least one domain group parameter corresponding to the at least one target domain parameter.

27. The computer-readable medium of claim 26, wherein the program instructions further comprise instructions for characterizing the domain state based on plural target domain parameters of types selected from: a quantity of receiving devices connected to the target domain, a quantity of devices disconnected from the target domain, and a quantity of data transactions performed by devices connected to the target domain.

28. The computer-readable medium of claim 27, wherein the program instructions further comprise instructions for determining the domain benchmark comprising an n-dimensional metric, wherein 'n' is greater than one and equal to a number of independent domain group parameters.

29. The computer-readable medium of claim 27, wherein the program instructions further comprise instructions for determining the domain benchmark comprising a weighted sum of independent domain group parameters.

30. In a system comprising multiple interlinked receiving devices for using protected content received from a content provider, a method for controlling use of content by devices in the domain, comprising:
selecting usage rules for a target domain comprising interlinked receiving devices for a defined user account by comparing a domain state for the target domain and a domain benchmark representing an aggregate of domain states of a plurality of independent device domains independent from the target domain, wherein the domain state represents a measure of at least one target domain parameter selected from (a) a quantity of receiving devices connected to the domain or (b) a quantity of data transactions performed by devices connected to the domain, wherein the target domain comprises a group of interconnected receiving devices for a defined content subscriber;
providing the usage rules to at least one device in the target domain; and
controlling use of content by devices in the target domain according to the usage rules to prevent unauthorized use of copyrighted content.

31. The method of claim 30, further comprising developing a risk index for the target domain in response to comparing the domain state for the target domain to the domain benchmark, and selecting the usage rules based on the risk index.

32. The method of claim 30, further comprising selecting the usage rules so as to reserve a number of permitted connections for a device disconnected from the target domain.

33. The method of claim 32, further comprising selecting the usage rules so as to reduce a number of remaining permitted connections for the target domain, based on the number of permitted connections to be reserved for a disconnected device.

34. The method of claim 33, further comprising selecting second usage rules for a disconnected device after it is disconnected from the target domain, wherein the second usage rules are related to the usage rules.

35. The method of claim 34, wherein selecting the second usage rules comprises permitting the disconnected device to provide content to at least one additional device disconnected from the target domain.

* * * * *